United States Patent
Fujiwara

(10) Patent No.: US 8,820,786 B2
(45) Date of Patent: Sep. 2, 2014

(54) SIDE AIRBAG AND METHOD OF MANUFACTURING THE SIDE AIRBAG

(75) Inventor: Yusuke Fujiwara, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/702,199

(22) PCT Filed: Jul. 27, 2011

(86) PCT No.: PCT/JP2011/067150
§ 371 (c)(1),
(2), (4) Date: Dec. 5, 2012

(87) PCT Pub. No.: WO2013/014773
PCT Pub. Date: Jan. 31, 2013

(65) Prior Publication Data
US 2014/0159354 A1  Jun. 12, 2014

(51) Int. Cl.
*B60R 21/207* (2006.01)
*B60R 21/233* (2006.01)
*B60R 21/2338* (2011.01)
*B60R 21/21* (2011.01)

(52) U.S. Cl.
CPC .................................... *B60R 21/21* (2013.01)
USPC ..................... 280/743.1; 280/729; 280/730.2; 280/743.2

(58) Field of Classification Search
CPC .................... B60R 21/2346; B60R 21/23138; B60R 21/233; B60R 21/2338; B60R 21/207; B60R 2021/23324; B60R 2012/23382; B60R 2021/23146

USPC ......................... 280/743.1, 743.2, 729, 730.2
See application file for complete search history.

(56) References Cited

U.S. PATENT DOCUMENTS

| 8,500,159 B2 * | 8/2013 | Feller et al. .................... 280/729 |
| 8,562,015 B2 * | 10/2013 | Yamamoto ..................... 280/729 |
| 8,662,529 B2 * | 3/2014 | Yamamoto ................. 280/730.2 |
| 2005/0161927 A1 | 7/2005 | Yokoyama et al. |
| 2006/0071458 A1 | 4/2006 | Sendelbach et al. |

FOREIGN PATENT DOCUMENTS

| JP | A-2004-338698 | 12/2004 |
| JP | A-2005-531451 | 10/2005 |
| JP | A-2007-38712 | 2/2007 |
| JP | A-2007-308122 | 11/2007 |
| JP | A-2011-126497 | 6/2011 |
| WO | WO 00/46076 | 8/2000 |

* cited by examiner

Primary Examiner — Ruth Ilan
(74) Attorney, Agent, or Firm — Oliff PLC

(57) ABSTRACT

It is provided a side airbag in which a bag thickness can be made thicker, without an undue increase in size. In a side airbag, a side panel formed in a belt shape is sewn to peripheral edge portions of a pair of main panels placed facing each other, whereby an airbag body is formed. A tether disposed inside this airbag body is folded in such a way that both lengthwise direction sides of the tether are aligned in a direction in which the pair of main panels face each other. One long-side edge portion of the tether is sewn to the pair of main panels and to a front portion of the side panel, and both lengthwise direction sides of another long-side edge portion of the tether are superimposed on top of each other and sewn together.

8 Claims, 8 Drawing Sheets

SIDE AIRBAG AND METHOD OF MANUFACTURING THE SIDE AIRBAG

TECHNICAL FIELD

The present invention relates to a side airbag for protecting an occupant when a vehicle experiences a side impact or the like and a method of manufacturing the side airbag.

BACKGROUND ART

In patent document 1 listed below, there is disclosed a flat two-chamber side airbag having a configuration where the neighborhoods of both side edges of a long and narrow rectangular partition wall (tether) are sewn to two base cloths (panels) and where the two panels are superimposed on top of each other and the neighborhoods of outer peripheral edge portions of the two panels are sewn together in a state in which the partition wall has been folded in two upward. This side airbag is stored in the side portion of a seat in a vehicle and protects the waist and the chest of an occupant by inflating and deploying between the occupant and the vehicle body side portion during a side impact or the like.

However, in the side airbag described above, the neighborhoods of the outer peripheral edge portions of the two panels are superimposed on top of each other and sewn together, so in order to make the thickness dimension (bag thickness) of the side airbag in the inflated and deployed state thicker to increase impact absorption, it is necessary to make the width dimensions (length dimensions along the vehicle body front-and-rear direction in the inflated and deployed state) of the two panels longer. For that reason, there is the potential for the side airbag to increase in size and for the time when the side airbag completely deploys to become later.

In patent document 2 listed below, there is disclosed a flat box-shaped side airbag (a so-called two-chamber 3D side airbag) comprising: two panels (main panels) having substantially the same shape that are placed facing each other; one belt-shaped panel (side panel) that is sewn to outer peripheral edge portions of the two main panels to thereby form a bag body together with the two main panels; and a tether that is formed in a long and narrow rectangular shape, is disposed inside the bag body, and is sewn to the two main panels to thereby section the inside of the bag body into upper and low chambers. In this two-chamber 3D side airbag, the bag thickness can be made thicker as a result of the side panel being set, so impact absorption can be ensured and an undue increase in size can be avoided.

Patent Document 1: Japanese Patent Application Laid-Open (JP-A) No. 2004-338698
Patent Document 2: JP-A No. 2007-38712

DISCLOSURE OF INVENTION

Technical Problem

However, when manufacturing the two-chamber 3D side airbag described above, both side edge portions of the tether are sewn to the two panels, and thereafter the outer peripheral edge portions of the two panels are sewn to the side panel. In this case, when the tether and the side panel are to be sewn together thereafter, the sewing ends up becoming three-dimensional sewing, so the sewing work becomes troublesome and mass production becomes difficult.

In consideration of the circumstances described above, it is an object of the present invention to obtain a side airbag, and a method of manufacturing the side airbag, in which the bag thickness can be made thicker, without an undue increase in size, as a result of the side panel being set and in which the tether and the side panel can be sewn together by flat sewing.

Solution to Problem

A side airbag according to an exemplary aspect includes: a pair of main panels that are placed facing each other; a side panel that is formed in a belt shape, that has one long-side edge portion that is sewn to a peripheral edge portion of one of the main panels and another long-side edge portion that is sewn to a peripheral edge portion of the other of the main panels, and that forms an airbag body together with the pair of main panels; and a tether that is formed in a belt shape, that is disposed inside the airbag body in a state in which the tether has been folded at a lengthwise direction center side thereof in such a way that both lengthwise direction sides of the tether are aligned in a direction in which the pair of main panels face each other, and that has one long-side edge portion sewn to the pair of main panels and to a site in the side panel that configures a front of the airbag body and that has another long-side edge portion having both lengthwise direction sides superimposed on top of each other and sewn together, so that the tether sections the inside of the airbag body into an upper chamber and a lower chamber.

The directions of "up", "down", and "front" indicate directions with respect to a vehicle in a state in which the side airbag is disposed in a vehicle and has inflated and deployed. Further, the "belt shape" pertaining to the tether includes not only a long and narrow rectangular shape but also a shape having one or several extended portions that extend in a direction orthogonal to a lengthwise direction of the tether from a long and narrow rectangular body section.

In the side airbag, the side panel formed in a belt shape is sewn to the peripheral edge portions of the pair of main panels placed facing each other, whereby the airbag body is formed. In this way, because the side panel is set, the bag thickness can be made thicker without an undue increase in size. Further, the belt-shaped tether that is disposed inside the airbag body and sections the inside of the airbag body into the upper chamber and the lower chamber is folded at the lengthwise direction center side thereof in such a way that both lengthwise direction sides of the tether are aligned in the direction in which the pair of main panels face each other. This tether has the one long-side edge portion that is sewn to the pair of main panels and to the site in the side panel that configures the front of the airbag body and the other long-side edge portion having both lengthwise direction sides superimposed on top of each other and sewn together. In this way, because the tether is set, when manufacturing the side airbag, the one long-side edge portion of the tether can be sewn to the pair of main panels and to the side panel before sewing together the peripheral edge portions of the pair of main panels and the side panel. Additionally, thereafter, it suffices to superimpose on top of each other and sew together both lengthwise direction sides of the other long-side edge portion of the tether and to finally sew together the peripheral edge portions of the pair of main panels and the side panel. Because of this, all of the sewing work can be performed by flat sewing.

A side airbag according to the exemplary aspect, wherein the airbag body is placed in a vehicle seat in such a way that, when gas is supplied to the inside of the airbag body from gas supplying means, the lower chamber inflates and deploys between the waist of an occupant seated in the vehicle seat and a vehicle body side portion, and the upper chamber inflates and deploys between the chest of the occupant and the vehicle body side portion; and inclined portions, that are inclined in such a way as to make a length dimension, along a vehicle body front-and-rear direction, of the upper chamber, in a completely deployed state of the airbag body, shorter towards an upper side thereof, are disposed on upper portion sides of front edge portions of the pair of main panels.

In the side airbag, when the gas is supplied from the gas supplying means to the inside of the airbag body, the lower chamber inflates and deploys between the waist of the occupant seated in the vehicle seat and the vehicle body side portion and the upper chamber inflates and deploys between the chest of the occupant and the vehicle body side portion. Additionally, the side airbag is configured in such a way that, in the state in which the airbag body has completely deployed, the length dimension of the upper chamber along the vehicle body front-and-rear direction becomes shorter towards the upper side thereof as a result of the inclined portions being disposed at the upper portion sides of the front edge portions of the pair of main panels. Because of this, restraint of the occupant by the upper chamber can be ensured and the capacity of the upper chamber can be reduced, so it becomes possible to supply the gas quickly to the lower chamber side that restrains the waist of the occupant. Because of this, it becomes possible to promptly restrain the waist of the occupant, so occupant restraint performance during the early stage of deployment of the side airbag can be improved.

A side airbag according to the exemplary aspect, wherein the vehicle seat is a driver's seat, and the airbag body is formed in such a way that, in a case in which the airbag body is seen from a vehicle body width direction in the completely deployed state, the upper chamber does not lie on top of an upper arm of a crash-test dummy of a standard American male seated in the driver's seat and the upper chamber lies on top of a shoulder of a crash-test dummy of a petite American female seated in the driver's seat.

The "crash-test dummy of a standard American male" and the "crash-test dummy of a petite American female" are seated in the driver's seat of the vehicle in the seating posture defined in the lateral collision test procedures (ECE R95) currently employed in Japan and Europe and the side impact test procedures in the United States (FMVSS 214).

In the side airbag, the airbag body is formed as described above. Here, in a case in which a crash-test dummy of a standard American male (called "AM50" below) is seated in the driver's seat, oftentimes the shoulder of AM50 is positioned at the upper side of the beltline of the side door of the vehicle. For that reason, when the side door glass ends up breaking due to the shock of a side impact or the like, there is the potential for reaction force to become unable to be applied to the shoulder of AM50 even in a case in which the shoulder of AM50 and the upper chamber lie on top of each other as seen from the vehicle body width direction. On the other hand, in a case in which the upper arm of AM50 and the upper chamber 34 lie on top of each other as seen from the vehicle body width direction, there is the potential for the upper arm of AM50 to be pushed against the chest by reaction force from the upper chamber, but in this present invention this can be avoided due to the above configuration.

In a case in which a crash-test dummy of a petite American female (called "AF05" below) is seated in the driver's seat, oftentimes the shoulder of AF05 is positioned at the lower side of the beltline of the side door of the vehicle. For this reason, in the present invention, the upper chamber is inflated and deployed in such a way that the shoulder of AF05 and the upper chamber lie on top of each other as seen from the vehicle body width direction. Because of this, reaction force from the side door can be applied to the shoulder of AF05 via the upper chamber, so the shoulder (a site whose tolerance is high) of AF05 can be excellently restrained.

A side airbag according to the exemplary aspect, wherein an interstice that allows the upper chamber and the lower chamber to be communicated with each other is formed between the tether and a site in the side panel that configures a rear of the airbag body.

In the side airbag, the upper chamber and the lower chamber are communicated with each other via the interstice formed between the tether and the site in the side panel that configures the rear of the airbag body. Consequently, by disposing in the interstice an inflator (gas supplying means) for supplying gas to the upper chamber and the lower chamber, gas can be excellently supplied to the upper chamber and the lower chamber.

A side airbag according to the exemplary aspect, wherein the tether has a pair of extended portions that extend in a direction orthogonal to a lengthwise direction of the tether from the other long-side edge portion of the tether at both lengthwise direction end sides of the tether; a check valve that extends toward one of the upper chamber side or the lower chamber side is formed as a result of the pair of extended portions being sewn together; and the upper chamber and the lower chamber are communicated with each other via an inner side of the check valve.

In the side airbag, the check valve is formed as a result of the pair of extended portions that extend from the other long-side edge portion of the tether at both lengthwise direction end sides of the tether being sewn together, and the upper chamber and the lower chamber are communicated with each other via the inner side of the check valve. Consequently, by disposing an inflator (gas supplying means) at the inner side of the check valve, gas can be excellently supplied to the upper chamber and the lower chamber. Moreover, the check valve extends toward one of the upper chamber side or the lower chamber side, so the check valve is closed as a result of the internal pressure of the one becoming higher. Because of this, the internal pressure of the one can be held in a high state.

A side airbag according to the exemplary aspect, wherein a check valve that is sewn in a tubular shape and is sewn to the other long-side edge portion of the tether in a state in which the check valve extends toward one of the upper chamber side or the lower chamber side is disposed between both lengthwise direction end sides of the tether; and the upper chamber and the lower chamber are communicated with each other via an inner side of the check valve.

In the side airbag, the check valve sewn in a tubular shape is disposed between both lengthwise direction end sides of the tether. This check valve is sewn to the other long-side edge portion of the tether, and the upper chamber and the lower chamber are communicated with each other via the inner side of the check valve. Consequently, by disposing an inflator (gas supplying means) at the inner side of the check valve, gas can be excellently supplied to the upper chamber and the lower chamber. Moreover, the check valve extends toward one of the upper chamber side or the lower chamber side, so the check valve is closed as a result of the internal pressure of the one becoming higher. Because of this, the internal pressure of the one can be held in a high state.

A side airbag according to the exemplary aspect, wherein a pair of triangular notches that are disposed from the other long-side edge portion of the tether and that become narrower in width heading toward the one long-side edge portion side of the tether are formed side-by-side in a lengthwise direction of the tether at the lengthwise direction center side of the tether; and edge portions of the notches are superimposed on top of each other and sewn together in such a way that openings in the notches at the other long-side edge portion side are closed.

In the side airbag, the pair of notches are formed in the lengthwise direction center side of the tether, and the edge portions of the notches are superimposed on top of each other and sewn together in such a way that the openings in the notches at the other long-side edge portion side are closed. Because of this, the extra-long portion that arises at the lengthwise direction center side in the tether can be reduced.

A side airbag manufacturing method according to an exemplary aspect includes: a first step of superimposing the side panel and the tether on top of each other in such a way that the side panel and the tether intersect each other, superimposing the one main panel on one lengthwise direction side of the tether and the one long-side edge portion of the side panel, superimposing the other main panel at the other lengthwise direction side of the tether and the other long-side edge portion of the side panel, and in this state linearly sewing the one long-side edge portion of the tether to the pair of main panels and to the side panel; a second step of superimposing and sewing together both lengthwise direction sides of the other long-side edge portion of the tether on top of each other; and a third step of sewing together the peripheral edge portion of the one main panel and the one long-side edge portion of the side panel and sewing together the peripheral edge portion of the other main panel and the other long-side edge portion of the side panel.

In the side airbag manufacturing method, in the first step, the side panel and the tether are superimposed on top of each other so as to intersect each other, the one main panel is superimposed on one lengthwise direction side of the tether and the one long-side edge portion of the side panel, and the other main panel is superimposed at the other lengthwise direction side of the tether and the other long-side edge portion of the side panel. In this state, the one long-side edge portion of the tether is linearly sewn to the pair of main panels and to the side panel. In this first step, the tether and the side panel can be sewn together by flat sewing. Next, in the second step, both lengthwise direction sides of the other long-side edge portion of the tether are superimposed on top of each other and sewn together. Next, in the third step, the peripheral edge portion of the one main panel and the one long-side edge portion of the side panel are sewn together, and the peripheral edge portion of the other main panel and the other long-side edge portion of the side panel are sewn together. Because of this, the side airbag can be manufactured. Moreover, the first step, the second step and the third steps can all be performed by flat sewing.

Advantageous Effects of Invention

As described above, in the side airbag and the side airbag manufacturing method pertaining to the present invention, the bag thickness can be made thicker, without an undue increase in size, as a result of the side panel being set, and the tether and the side panel can be sewn together by flat sewing.

BEST MODES FOR CARRYING OUT THE INVENTION

First Embodiment

Figure 1:
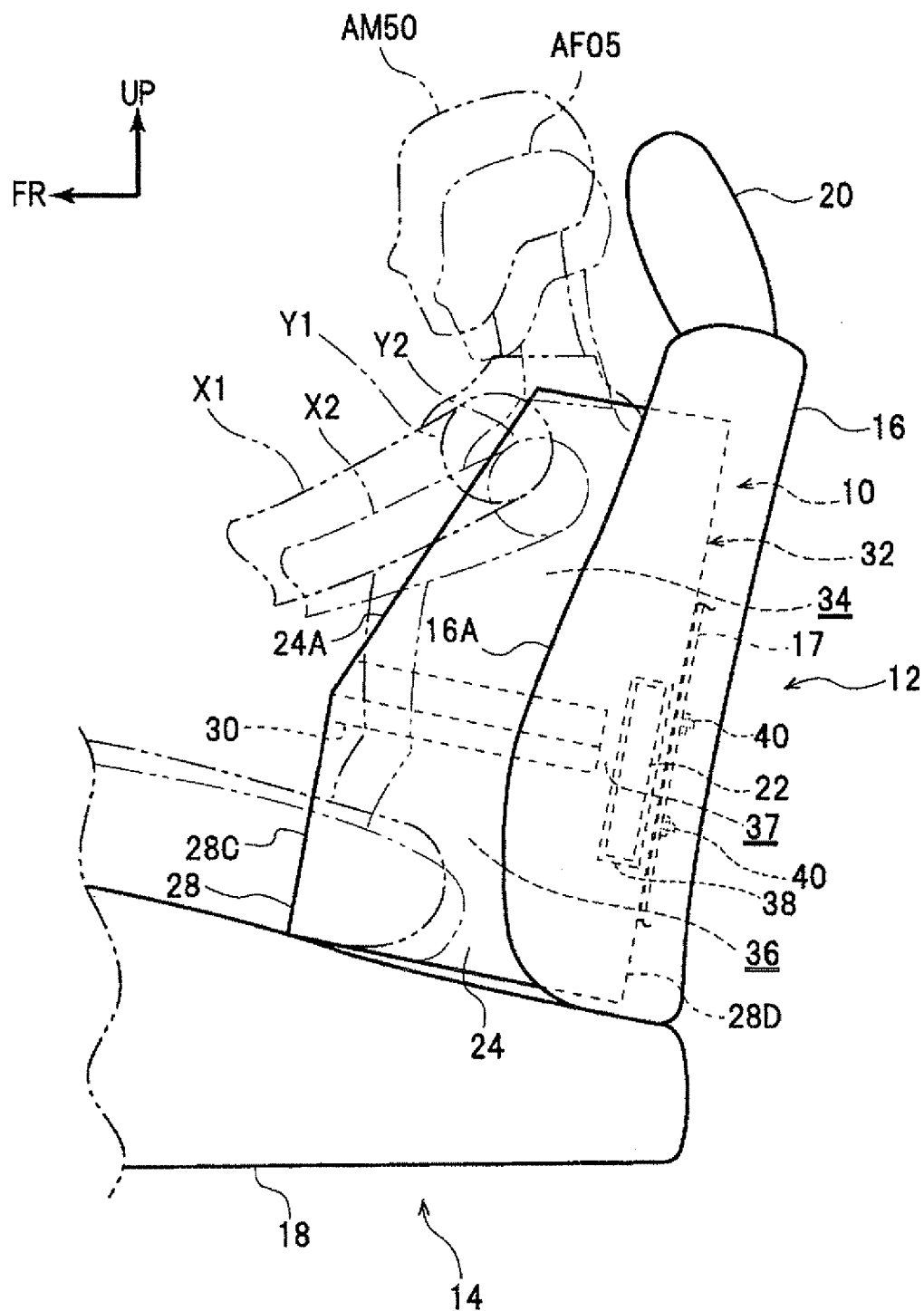
FIG. 1 is a side view showing the configurations of main portions of a vehicle seat (a driver's seat) in which is installed a side airbag device equipped with a side airbag pertaining to a first embodiment of the present invention.

A side airbag 10 pertaining to a first embodiment of the present invention and a method of manufacturing the side airbag 10 will be described below using FIG. 1 to FIG. 5. Arrow FR appropriately shown in the drawings indicates the front direction of a vehicle in which this side airbag 10 is installed, arrow UP represents the up direction of the vehicle, and arrow W represents the width direction of the vehicle.

As shown in FIG. 1, the side airbag 10 pertaining to the present first embodiment is a configural member of a side airbag device 12 and is installed in a door-side side portion 16A (a side portion at the side of an unillustrated side door) of a seat back 16 in a driver's seat 14 (a vehicle seat) of the vehicle. This seat back 16 is tiltably connected to a rear end portion of a seat cushion 18, and a headrest 20 is connected to an upper end portion of the seat back 16. In the present embodiment, the front direction, the up direction, and the width direction of the driver's seat 14 coincide with the front direction, the up direction, and the width direction of the vehicle.

Figure 2:
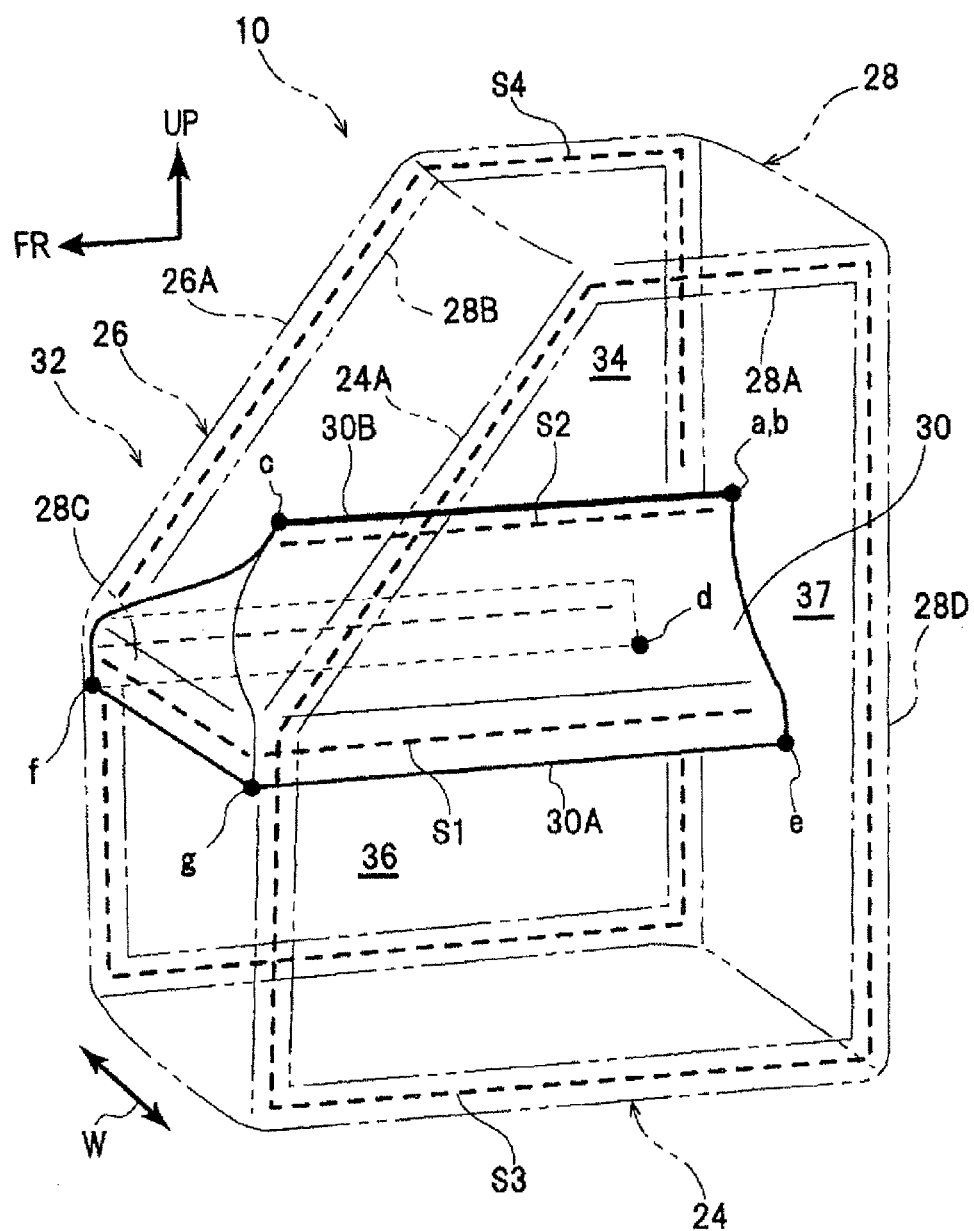
FIG. 2 is a perspective view of the same side airbag.

The side airbag device 12 is equipped with an inflator 22 (not shown in FIG. 2) serving as gas supplying means that generates gas inside the side airbag 10, and a unit in which the side airbag 10 is unitized together with the inflator 22 and so forth in a state in which the side airbag 10 has been folded up is disposed inside the door-side side portion 16A. In FIG. 1 and FIG. 2, a state in which the side airbag 10 has been inflated and deployed (a completely deployed state) by the pressure of the gas that the inflator 22 generates is shown. Further, although it is not shown, a seatback pad (a urethane pad) covered by seat upholstery is placed around the side airbag device 12, and when the side airbag 10 inflates and deploys, a seam of the seat upholstery and the seatback pad split open.

As shown in FIG. 2, the side airbag 10 is a so-called two-chamber 3D side airbag and is formed as a result of a pair of main panels (base cloths) 24 and 26, a side panel (a side cloth) 28, and a tether (a partition wall cloth) 30 being sewn together.

The pair of main panels 24 and 26 are both formed in long substantially rectangular shapes (pentagonal shapes) and are placed in a state in which they face each other. The side panel 28 is formed in a belt shape (a long and narrow rectangular shape) and has one long-side edge portion 28A that is sewn to a peripheral edge portion of the one main panel 24 at a seam S3 and another long-side edge portion 28B that is sewn to a peripheral edge portion of the other main panel 26 at a seam S4. Because of this, a flat box-shaped bag-like airbag body 32 (a bag body) is formed by the pair of main panels 24 and 26 and the side panel 28.

This airbag body 32 is, in the completely deployed state shown in FIG. 1 and FIG. 2, placed in a state in which the pair of main panels 24 and 26 face each other in the vehicle width direction and in which the lengthwise direction of the pair of main panels 24 and 26 is along the up-and-down direction of the seatback 16. The front, rear, up, and down directions in regard to the side airbag 10 given in the description below are directions in the completely deployed state shown in FIG. 1 and FIG. 2 and substantially coincide with the front, rear, up, and down directions of the vehicle.

The tether 30 is formed in a belt shape (a long and narrow rectangular shape) and is placed a little at the lower side of the up-and-down direction center portion of the inside of the airbag body 32 in a state in which the tether 30 has been folded (bent) at the lengthwise direction center side thereof in such a way both lengthwise direction sides of the tether 30 are aligned in the direction in which the pair of main panels 24 and 26 face each other. The lengthwise direction center side of the tether 30 is placed facing a site (called a "front portion 28C" below) in the side panel 28 that configures a front of the airbag body 32.

This tether 30 has one long-side edge portion 30A that is sewn to the pair of main panels 24 and 26 and to the front portion 28C of the side panel 28 at a seam S1. Specifically, one lengthwise direction side of the one long-side edge portion 30A is sewn to the one main panel 24, the lengthwise direction center side of the one long-side edge portion 30A is sewn to the front portion 28C of the side panel 28, and the other lengthwise direction side of the one long-side edge portion 30A is sewn to the other main panel 26. Further, the tether 30 has another long-side edge portion 30B that is folded at the lengthwise direction center portion thereof and both of whose lengthwise direction sides are superimposed on top of each other, with the superimposed sections being sewn together at a seam S2. Because of this, the inside of the airbag body 32 is sectioned by the tether 30 into an upper chamber 34 and a lower chamber 36. In the present embodiment, the other long-side edge portion 30B of the tether 30 is placed more at the upper side of the airbag body 32 than the one long-side edge portion 30A.

Further, an interstice 37 that allows the upper chamber 34 and the lower chamber 36 to be communicated with each other is formed between the tether 30 and a site (called a "rear portion 28D" below) in the side panel 28 that configures a rear of the airbag body 32. As shown in FIG. 1, the inflator 22 is placed in this interstice 37.

The inflator 22 is formed in a cylindrical shape and is placed in a state in which the axial direction thereof is along the up-and-down direction of the seatback 16. This inflator 22 is inserted into the inner side of a retainer 38 formed in a tubular shape and is fixed to the retainer 38 by caulking or other means. An upper and lower pair of stud bolts 40 project toward the vehicle rear side from an outer peripheral portion of the retainer 38. These stud bolts 40 penetrate the rear portion 28D of the side panel 28 and penetrate a side frame 17 of a seatback frame, and nuts are screwed on distal end sides of the stud bolts 40. Because of this, the retainer 38 is fixed to the side frame 17, and the side airbag 10 is attached to the side frame 17 by the retainer 38.

An airbag ECU and an airbag sensor (neither of which is shown in the drawings) installed in the vehicle are electrically connected to the inflator 22. This airbag ECU determines whether or not to activate the side airbag device 12 on the basis of a detection signal from the airbag sensor when the vehicle has experienced a side impact or overturned. When this determination is YES, a predetermined current is passed through the inflator 22. Because of this, the inflator 22 is activated and gas is discharged from an unillustrated gas discharge outlet disposed at the lower end side of the inflator 22.

The gas discharged from the inflator 22 flows into the upper chamber 34 via an opening in the upper end of the retainer 38 and flows into the lower chamber 36 via an opening in the lower end of the retainer 38. That is, the retainer 38 also functions as a diffuser that diffuses the gas discharged from the inflator 22. Because of this, as shown in FIG. 1, the side airbag 10 inflates and deploys toward the front side and in the up-and-down direction of the seatback 16. Specifically, the lower chamber 36 inflates and deploys between the waist of an occupant (see AM50 and AF05 in FIG. 1) seated in the driver's seat 14 and the side door (not shown in the drawings), and the upper chamber 34 inflates and deploys between the chest of the occupant and the side door. In this case, because the gas discharge outlet of the inflator 22 is placed facing downward, the lower chamber 36 completely deploys before the upper chamber 34. Further, the internal pressure of the lower chamber 36 is set so as to become higher than the internal pressure of the upper chamber 34.

In FIG. 1, AM50 is a crash-test dummy of a standard American male, and AF05 is a crash-test dummy of a petite American female. These dummies are seated in the driver's seat 14 in the seating posture defined in the lateral collision test procedures (ECE R95) currently employed in Japan and Europe and the side impact test procedures in the United States (FMVSS 214).

As shown in FIG. 2, inclined portions 24A and 26A that are inclined in such a way as to make the length dimension, along the vehicle body front-and-rear direction, of the upper chamber 34 in the completely deployed state of the airbag body 32 shorter towards an upper side thereof are disposed on upper portion sides of front edge portions of the pair of main panels 24 and 26. Because of this, the airbag body 32 is formed in such a way that, in a case in which the airbag body 32 is seen from the vehicle body width direction in the completely deployed state as shown in FIG. 1, the upper chamber 34 does not lie on top of an upper arm X1 of AM50 seated in the driver's seat 14 and the upper chamber 34 lies on top of a shoulder Y2 of AF05 seated in the driver's seat 14. In FIG. 1, X2 is an upper arm of AF05, and Y1 is a shoulder of AM50.

Next, a method of manufacturing the side airbag 10 will be described.

Figure 3:
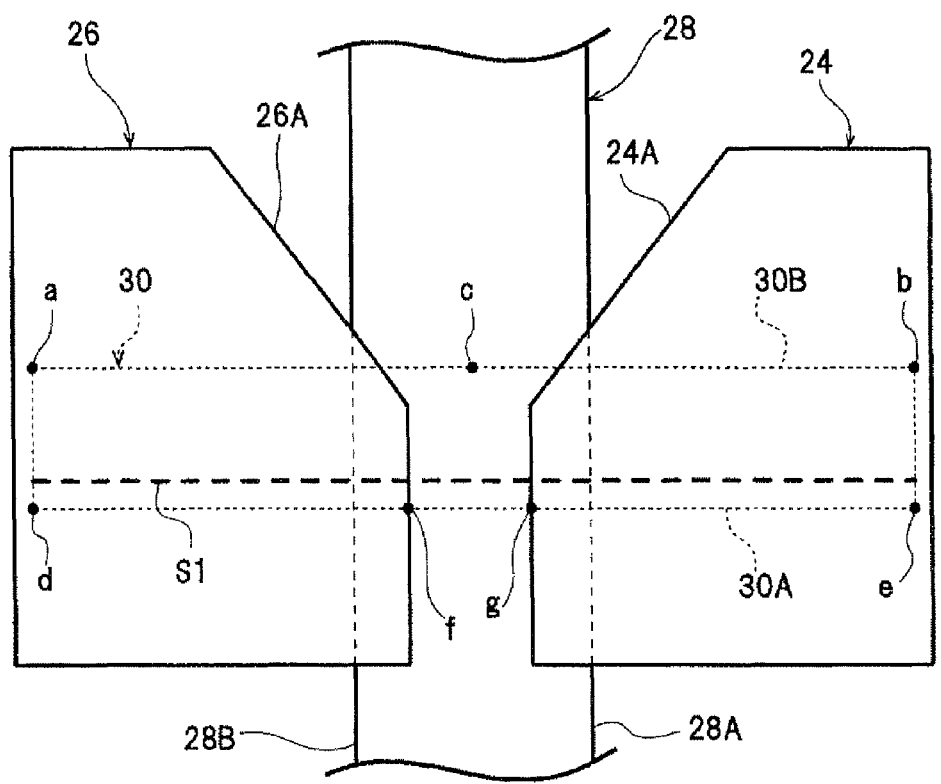
FIG. 3 is a developed view showing a state in which the same side airbag is in the middle of being sewn and is a view for describing a first step in steps of sewing the same side airbag.

In the present first embodiment, a first step, a second step, and a third step are set as steps of manufacturing the side airbag 10. In the first step, first, as shown in FIG. 3, the side panel 28 and the tether 30 are superimposed on top of each other in such a way that they intersect (are orthogonal to) each other, the one main panel 24 is superimposed on one lengthwise direction side of the tether 30 and the one long-side edge portion 28A of the side panel 28, and the other main panel 26 is superimposed at the other lengthwise direction side of the tether 30 and the other long-side edge portion 28B of the side panel 28. In this state, the one long-side edge portion 30A of the tether 30 is linearly sewn to the pair of main panels 24 and 26 and to the side panel 28 (see seam S1 in FIG. 3).

Figure 4:
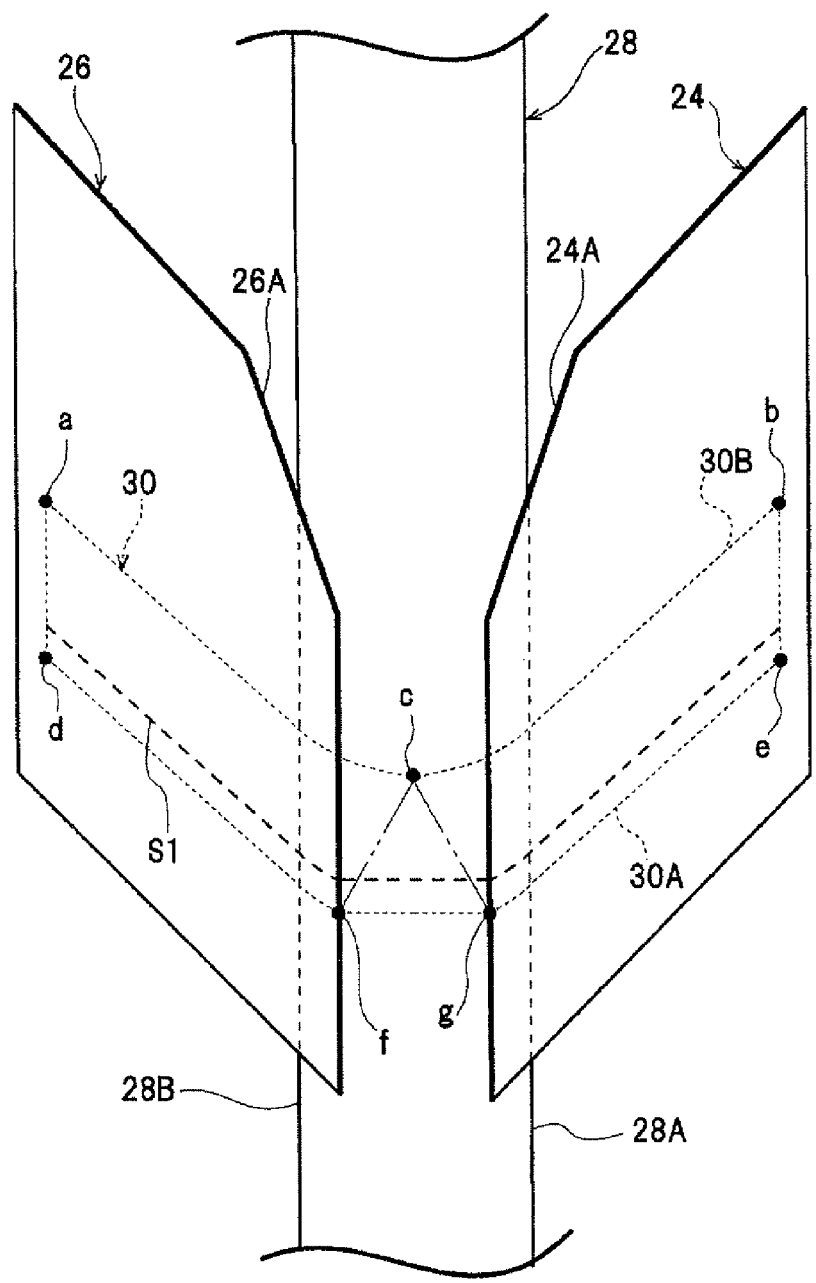
FIG. 4 is a developed view showing a state in which the same side airbag is in the middle of being sewn and is a view for describing a second step in steps of sewing the same side airbag.

Next, in the second step, as shown in FIG. 4, the pair of main panels 24 and 26 are brought closer to each other with the tether 30 at the inside, and the one lengthwise direction side (the section between b and c in FIG. 4) and the other lengthwise direction side (the section between a and c in FIG. 4) of the other long-side edge portion 30B of the tether 30 are superimposed on top of each other. Then, these superimposed sections are sewn together as shown in FIG. 2 (see seam S2 in FIG. 2). In FIG. 2 to FIG. 4, hypothetical black circles and reference signs "a" to "g" are given in order to make it easier to understand the positional relationships of the portions of the tether 30.

Next, in the third step, the peripheral edge portion of the one main panel 24 and the one long-side edge portion 28A of the side panel 28 are sewn together (see seam S3 in FIG. 2), and the peripheral edge portion of the other main panel 26 and the other long-side edge portion 28B of the side panel 28 are sewn together (see seam S4 in FIG. 2). Because of this, the side airbag 10 pertaining to the present embodiment is manufactured.

The first step, the second step, and the third step are all performed by flat sewing. Further, in the first step, the order in which the pair of main panels 24 and 26, the side panel 28, and the tether 30 are superimposed on top of each other is not limited to the above order and can be appropriately changed. Further, in the third step, as for the order in which the seams S3 and S4 are sewn, either may be first. However, it is necessary insert the inflator 22 into the inside of the airbag body 32 before completely sewing the later one of the seams S3 and S4.

Next, the action and effects of the present first embodiment will be described.

In the side airbag 10 having the above configuration, the side panel 28 formed in a belt shape is sewn to the peripheral edge portions of the pair of main panels 24 and 26 placed facing each other, whereby the airbag body 32 is formed. In this way, because the side panel is set, the bag thickness (the thickness dimension of the airbag body 32 along the vehicle body width direction in the completely deployed state) can be made thicker without an undue increase in size.

Further, the tether 30 that is disposed inside the airbag body 32 and sections the inside of the airbag body 32 into the upper chamber 34 and the lower chamber 36 is folded at the lengthwise direction center side thereof in such a way that both lengthwise direction sides of the tether 30 are aligned in the direction in which the pair of main panels 24 and 26 face each other. This tether 30 has the one long-side edge portion 30A that is sewn to the pair of main panels 24 and 26 and to the front portion 28C of the side panel 28 and the other long-side edge portion 30B having both lengthwise direction sides superimposed on top of each other and sewn together. In this way, because the tether 30 is set, when manufacturing the side airbag 10, the one long-side edge portion 30A of the tether 30 can be sewn to the pair of main panels 24 and 26 and to the front portion 28C of the side panel 28 before sewing together the peripheral edge portions of the pair of main panels 24 and 26 and the side panel 28. Additionally, thereafter, it suffices to superimpose on top of each other and sew together both lengthwise direction sides of the other long-side edge portion 30B of the tether 30 and to finally sew together the peripheral edge portions of the pair of main panels 24 and 26 and the side panel 28. Because of this, all of the sewing work can be performed by flat sewing, so the sewing work can be made easier, and the efficiency of mass production can be improved.

Figure 5A:
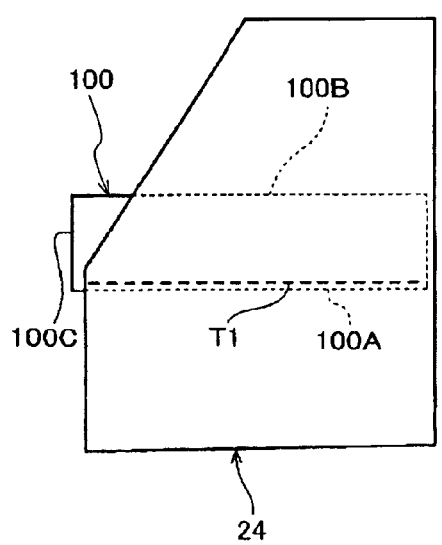
FIG. 5A to FIG. 5D show steps of manufacturing a comparative example of the embodiments of the present invention, with FIG. 5A being a plan view showing a first step, FIG. 5B being a perspective view showing a second step, FIG. 5C being a perspective view showing a third step, and FIG. 5D being a perspective view showing a fourth step.
Figure 5B:
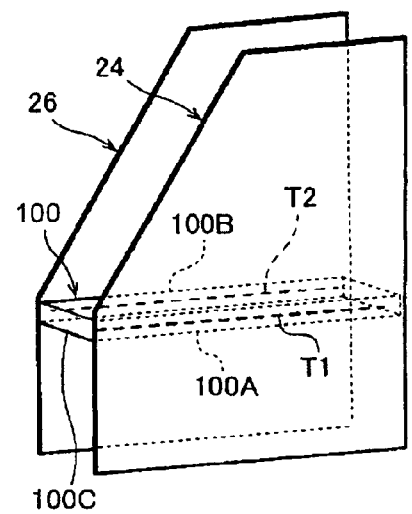
Figure 5C:
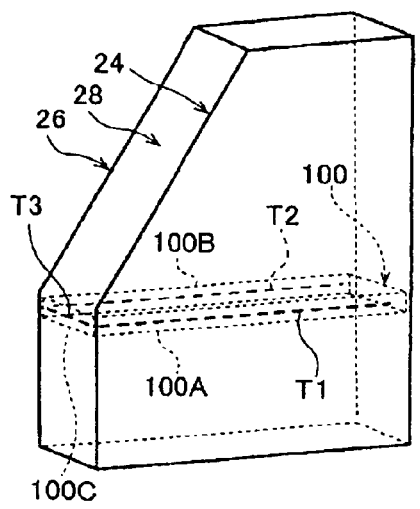
Figure 5D:
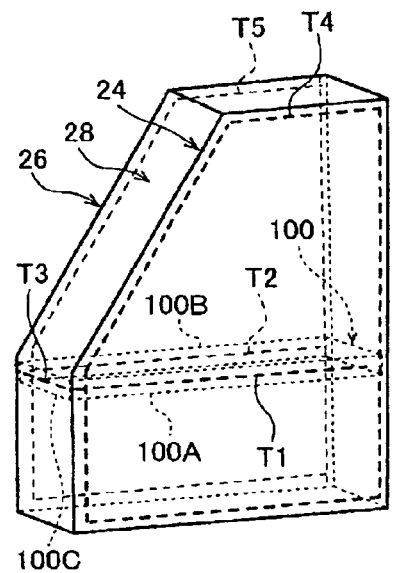

That is, when manufacturing a comparative example (a side airbag in which the configuration of the tether is basically the same as in the two-chamber 3D side airbag described in the "Background Art" section) shown in FIG. 5A to FIG. 5D, for example, first, as shown in FIG. 5A, one long-side edge portion 100A of a tether 100 is sewn to one main panel 24 (see seam T1). Next, as shown in FIG. 5B, another long-side edge portion 100B of the tether 100 is sewn to another main panel 26 (see seam T2). Next, as shown in FIG. 5C, one short-side edge portion 100C of the tether 100 is sewn to a side panel 28 (see seam T3). Next, as shown in FIG. 5D, the peripheral edge portions of the pair of main panels 24 and 26 and the side panel 28 are sewn together (see seam T4 and seam T5). In the case of this manufacturing method, when sewing the seam T3, three-dimensional sewing ends up being employed, so the sewing work becomes troublesome and mass production becomes difficult (in FIG. 5A to FIG. 5D, the same reference signs are given in regard to configurations that are basically the same as those in the present embodiment). In contrast, in the present embodiment, as described above, all of the sewing work can be performed by flat sewing, so mass production of a two-chamber 3D side airbag can be made easy and manufacturing costs can be reduced.

Moreover, in this side airbag 10, when the inflator 22 generates gas inside the airbag body 32, the upper chamber 34 inflates and deploys between the chest of the occupant (see AM50 and AF05 in FIG. 1) seated in the driver's seat 14 and the side door and the lower chamber 36 inflates and deploys between the waist of the occupant and the side door. Additionally, the side airbag 10 is configured in such a way that, in the completely deployed state of the airbag body 32 (the state shown in FIG. 1), the length dimension of the upper chamber 34 along the vehicle body front-and-rear direction becomes shorter towards an upper side thereof as a result of the inclined portions 24A and 26A being disposed at the upper portion sides of the front edge portions of the pair of main panels 24 and 26. Because of this, restraint of the occupant by the upper chamber 34 can be ensured and the capacity of the upper chamber 34 can be reduced, so it becomes possible to supply gas quickly to the lower chamber 36 side that restrains the waist of the occupant. Because of this, it becomes possible to promptly restrain the waist of the occupant, so occupant restraint performance during the early stage of deployment of the side airbag 10 can be improved.

Moreover, in the side airbag 10, the airbag body 32 is formed in such a way that, in a case in which the airbag body 32 is seen from the vehicle body width direction in the completely deployed state, the upper chamber 34 does not lie on top of the upper arm X1 of AM50 seated in the driver's seat 14 and the upper chamber 34 lies on top of the shoulder Y2 of AF05 seated in the driver's seat 14.

Here, in a case in which AM50 is seated in the driver's seat 14, oftentimes the shoulder Y1 of AM50 is positioned at the upper side of the beltline of the side door. For that reason, when the side door glass ends up breaking due to the shock of a side impact or the like, there is the potential for reaction force to become unable to be applied to the shoulder Y1 of AM50 even in a case in which the shoulder Y1 of AM50 and the upper chamber 34 lie on top of each other as seen from the vehicle body width direction. On the other hand, in a case in which the upper arm X1 of AM50 and the upper chamber 34 lie on top of each other as seen from the vehicle body width direction, there is the potential for the upper arm X1 of AM50 to be pushed against the chest of AM50 by reaction force from the upper chamber 34, but in this present embodiment this can be avoided due to the above configuration.

In a case in which AF05 is seated in the driver's seat 14, oftentimes the shoulder Y2 of AF05 is positioned at the lower side of the beltline of the side door of the vehicle. For this reason, in the present embodiment, the upper chamber 34 is inflated and deployed in such a way that the shoulder Y2 of AF05 and the upper chamber 34 lie on top of each other as seen from the vehicle body width direction. Because of this, reaction force from the side door can be applied to the shoulder Y2 of AF05 via the upper chamber 34, so the shoulder Y2 of AF05 can be excellently restrained.

Further, in this side airbag 10, the interstice 37 that allows the upper chamber 34 and the lower chamber 36 to be communicated with each other is formed between the tether 30 and the rear portion 28D of the side panel 28, and the inflator 22 and the retainer 38 are placed in the interstice 37. Because of this, gas can be excellently supplied to the upper chamber 34 and the lower chamber 36.

Next, other embodiments of the present invention will be described. In regard to configurations and action that are basically the same as those in the first embodiment, the same reference signs as those in the first embodiment will be given thereto and description thereof will be omitted.

Second Embodiment

Figure 6:
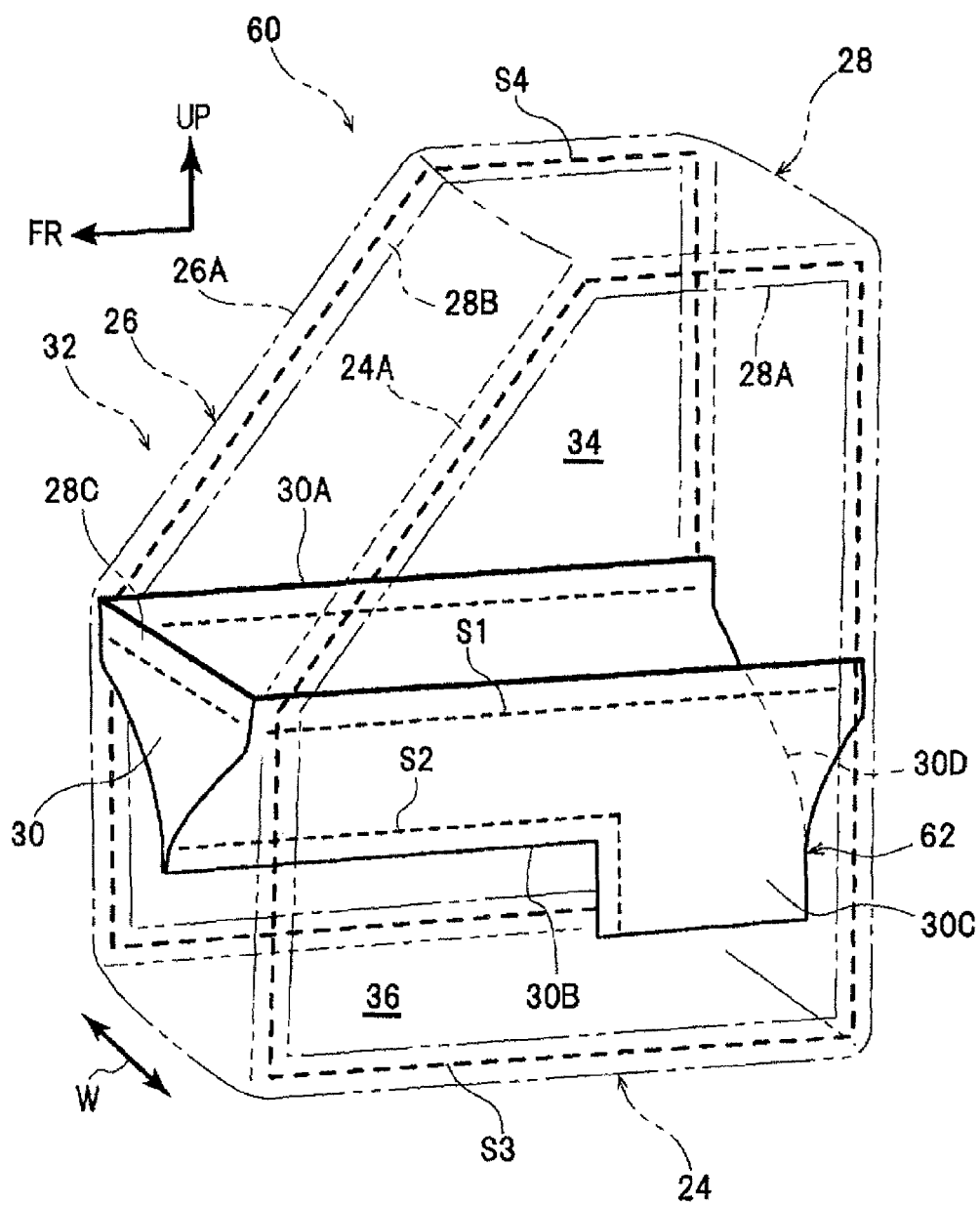
FIG. 6 is a perspective view of a side airbag pertaining to a second embodiment of the present invention.
Figure 7:
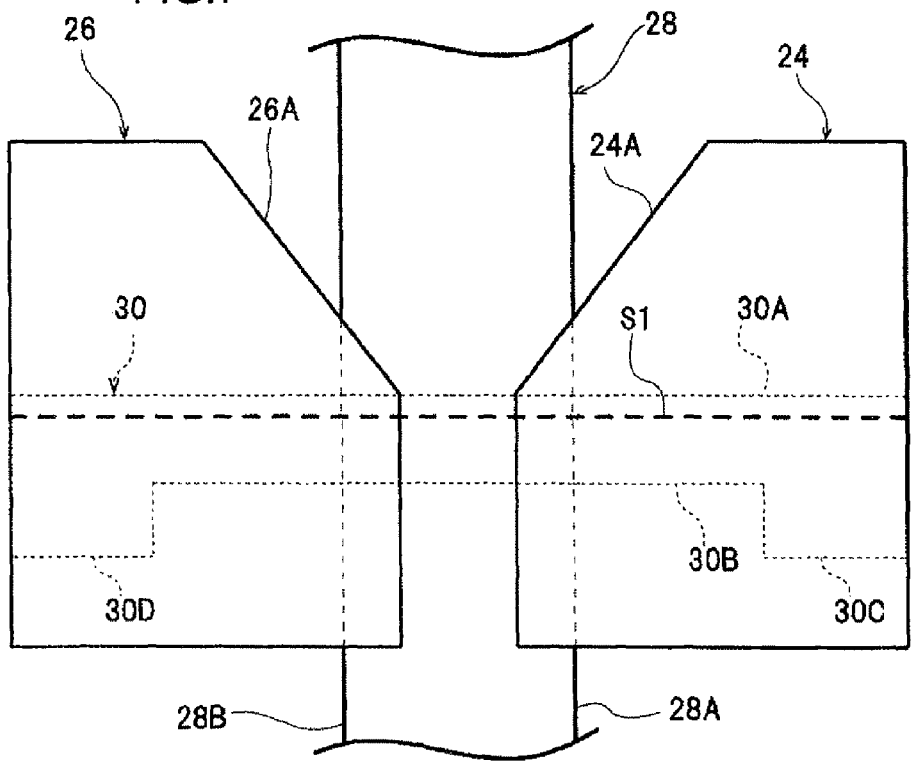
FIG. 7 is a developed view corresponding to FIG. 3 showing a state in which the same side airbag is in the middle of being sewn.

In FIG. 6, a side airbag 60 pertaining to a second embodiment of the present invention is shown in a perspective view corresponding to FIG. 2. Further, in FIG. 7, the configurations of main portions of this side airbag 60 are shown in a developed view corresponding to FIG. 3. This embodiment is given basically the same configuration as that of the first embodiment. However, in this embodiment, the interstice 37 pertaining to the first embodiment is omitted. Further, in this embodiment, the other long-side edge portion 30B of the tether 30 is placed more at the lower side of the airbag body 32 than the one long-side edge portion 30A, and a check valve 62 is configured by a pair of extended portions 30C and 30D that extend from the other long-side edge portion 30B of the tether 30.

The one extended portion 30C extends in a direction orthogonal to a lengthwise direction of the tether 30 from the other long-side edge portion 30B at one lengthwise direction end portion of the tether 30. The other extended portion 30D extends in a direction orthogonal to the lengthwise direction of the tether 30 from the other long-side edge portion 30B at the other lengthwise direction end portion of the tether 30. Edge portions of these extended portions 30C and 30D facing the lengthwise direction center side of the tether 30 are superimposed on top of each other, and the extended portions 30C and 30D are sewn together in the up-and-down direction of the airbag body 32 at the rear end side of the seam S2. Because of this, the check valve 62 is formed, and the upper chamber 34 and the lower chamber 36 are communicated with each other via the inner side of the check valve 62. The inflator 22 and the retainer 38 (not shown in FIG. 6) are placed at the inner side of this check valve 62.

When gas first begins to be discharged from the inflator 22, the lower end sides of the extended portions 30C and 30D are moved away from each other by the wind pressure of the gas, whereby the check valve 62 allows supply of the gas to the lower chamber 36. When the gas pressure inside the lower chamber 36 rises to a predetermined value or greater, the lower end sides of the extended portions 30C and 30D move closer together and come into close contact with each other, whereby the check valve 62 is closed and regulates the movement of the gas from the lower chamber 36 to the upper chamber 34. Because of this, the internal pressure of the lower chamber 36 can be held in a high state, so the waist of the occupant whose tolerance is high can be excellently restrained by the lower chamber 36. Moreover, because the check valve 62 is configured by the pair of extended portions 30C and 30D disposed at the tether 30, the check valve can be set simply and inexpensively.

Third Embodiment

Figure 8:
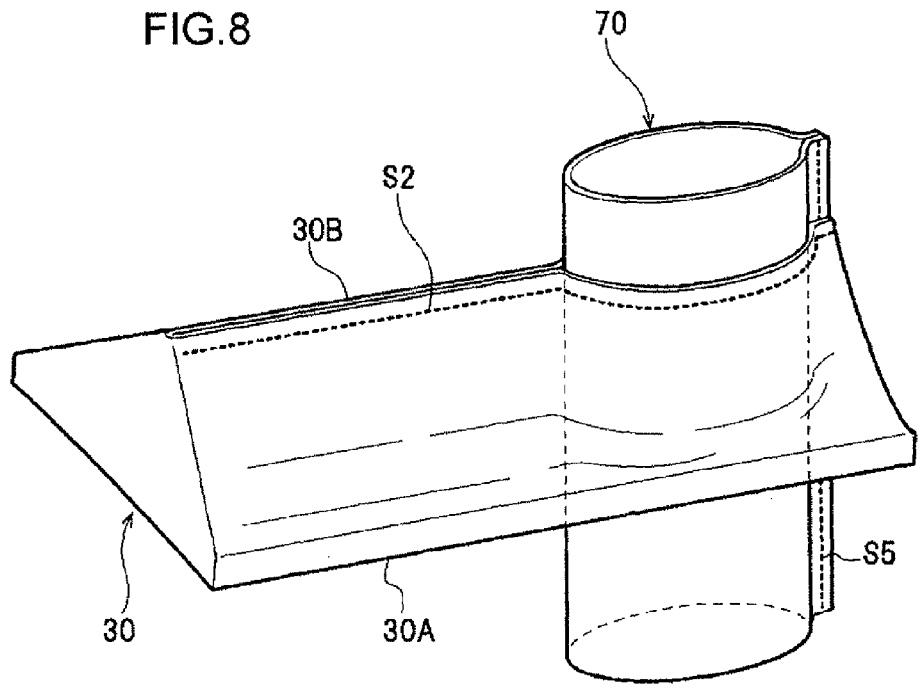
FIG. 8 is a perspective view showing the configurations of a tether and a check valve pertaining to a third embodiment of the present invention.

In FIG. 8, the configurations of a tether 30 and a check valve 70 pertaining to a third embodiment of the present invention are shown in a perspective view. This embodiment is given basically the same configuration as that of the first embodiment, but in this embodiment, the interstice 37 is omitted like in the second embodiment and the upper chamber 34 and the lower chamber 36 are communicated with each other via the inner side of the check valve 70. However, this check valve 70 is sewn in a tubular shape as a result of a cloth member separate from the tether 30 being sewn together at a seam S5, is placed between both lengthwise direction end sides of the tether 30, and is sewn to the other long-side edge portion 30B of the tether 30 at the seam S2. This check valve 70 extends toward the lower chamber 36 side, and the inflator 22 and the retainer 38 (not shown in FIG. 8) are placed at the inner side of the check valve 70. In this embodiment also, like in the second embodiment, the lower end side of the check valve 70 is closed by a rise in the internal pressure of the lower chamber 36, whereby the internal pressure of the lower chamber 36 can be held in a high state.

The third embodiment is given a configuration where the check valve 70 is sewn to the tether 30 at the seam S2, but the third embodiment is not limited to this and may also be given a configuration where the check valve 70 is not sewn to the tether 30. That is, for example, the third embodiment may also be given a configuration where an inner tube (a diffuser) made of cloth and having the functions of a tether and a check valve is fitted into (passed through) the interstice 37 (see FIG. 1 and FIG. 2) in the first embodiment and where the inflator 22 is placed at the inner side of the inner tube. In this case, the inner tube receives the supply of the gas from the inflator 22 and inflates, whereby the interstice 37 can become stopped up. Because of this, the flow of gas between the upper and lower chambers 34 and 36 via the interstice 37 can be suppressed.

Fourth Embodiment

Figure 9:
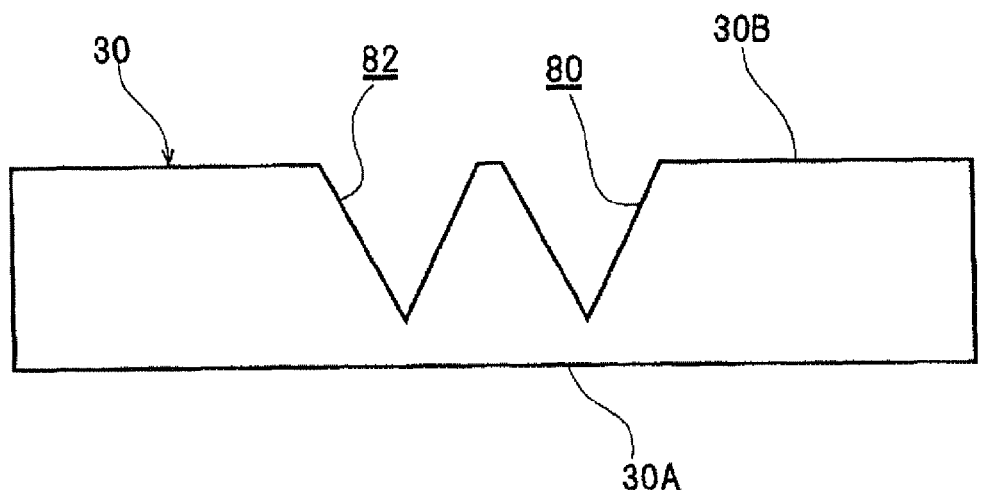
FIG. 9 is a developed view of a tether pertaining to a fourth embodiment of the present invention.
Figure 10:
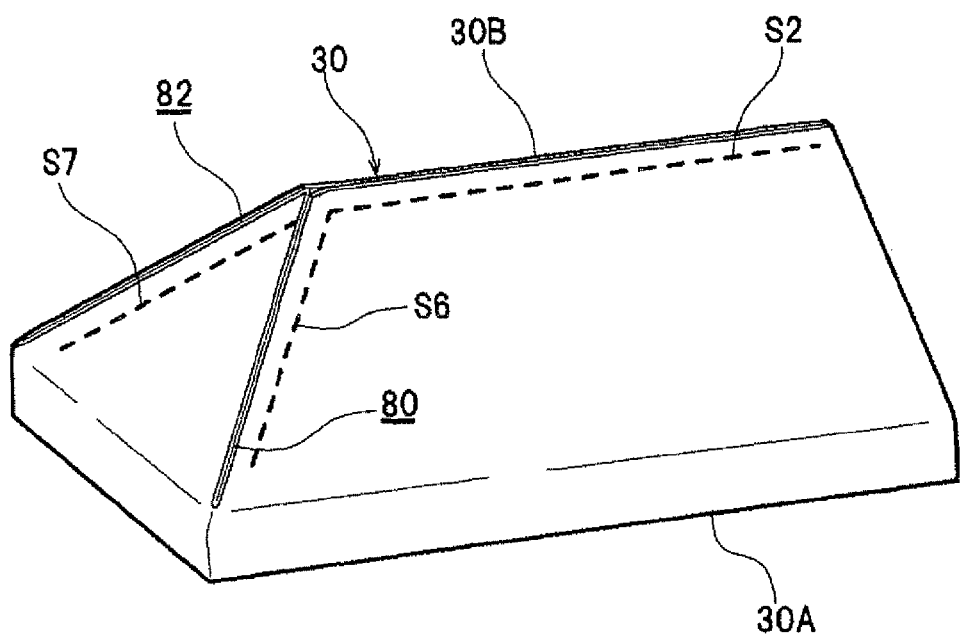
FIG. 10 is a perspective view showing a state in which parts of the same tether have been sewn together.

In FIG. 9, the configuration of a tether 30 pertaining to a fourth embodiment of the present invention is shown in a developed view. Further, in FIG. 10, a state in which parts of this tether 30 have been sewn together is shown in a perspective view. This embodiment is given basically the same configuration as that of the first embodiment, but as shown in FIG. 9, a pair of triangular notches 80 and 82 that are disposed from the other long-side edge portion 30B and become narrower in width heading toward the one long-side edge portion 30A side are formed side-by-side in the lengthwise direction of the tether 30 in the lengthwise direction center side of the tether 30. In this tether 30, as shown in FIG. 10, edge portions of the notches 80 and 82 are superimposed on top of each other in such a way that openings in the notches 80 and 82 at the other long-side edge portion 30B side are closed, and these superimposed sections are sewn together at seams S6 and S7. Because of this, the extra-long portion that arises at the lengthwise direction center side of the tether 30 can be reduced, and the tether 30 can be made lightweight.

<Supplemental Description of Embodiments>

In each of the above embodiments, the side airbag is given a configuration where the airbag body 32 is formed in such a way that, in a case in which the completely deployed state of the airbag body 32 is seen from the vehicle body width direction, the upper chamber 34 does not lie on top of the upper arm X1 of AM50 seated in the driver's seat 14 and the upper chamber 34 lies on top of the shoulder Y2 of AF05 seated in the driver's seat 14, but the inventions are not limited to this, and the shape of the airbag body 32 can be appropriately changed.

Further, in each of the above embodiments, a case in which the side airbag 10 or 60 is disposed in the driver's seat 14 of the vehicle has been described, but the side airbags can also be disposed in the seat next to the driver's seat and in the rear seats of the vehicle.

Further, in each of the above embodiments, the side airbag is given a configuration where the pair of main panels 24 and 26 are formed in long pentagonal shapes as a result of the inclined portions 24A and 26A being disposed at the pair of main panels 24 and 26, but the invention is not limited to this, and the shapes of the pair of main panels can be appropriately changed. For example, the side airbag may also be given a configuration where the pair of main panels are formed in quadrilateral shapes or hexagonal shapes.

Further, in the second embodiment and the third embodiment described above, the side airbag is given a configuration where the check valve 62 or 70 extends toward the lower chamber 36 side, but the inventions are not limited to this and may also be given a configuration where the check valve extends toward the upper chamber side.

In addition, the present invention can be changed in a variety of ways and implemented in a scope that does not depart from the gist thereof. Further, it goes without saying that the scope of rights of the present invention is not limited to the embodiments described above.

The invention claimed is:

1. A side airbag comprising:
   a pair of main panels that are placed facing each other;
   a side panel that is formed in a belt shape, that has one long-side edge portion that is sewn to a peripheral edge portion of one of the main panels and another long-side edge portion that is sewn to a peripheral edge portion of the other of the main panels, and that forms an airbag body together with the pair of main panels; and
   a tether that is formed in a belt shape, that is disposed inside the airbag body in a state in which the tether has been folded at a lengthwise direction center side thereof in such a way that both lengthwise direction sides of the tether are aligned in a direction in which the pair of main panels face each other, and that has one long-side edge portion sewn to the pair of main panels and to a site in the side panel that configures a front of the airbag body and that has another long-side edge portion having both lengthwise direction sides superimposed on top of each other and sewn together, so that the tether sections the inside of the airbag body into an upper chamber and a lower chamber.

2. The side airbag according to claim 1, wherein:
   the airbag body is placed in a vehicle seat in such a way that, when gas is supplied to the inside of the airbag body from gas supplying means, the lower chamber inflates and deploys between the waist of an occupant seated in the vehicle seat and a vehicle body side portion, and the upper chamber inflates and deploys between the chest of the occupant and the vehicle body side portion; and
   inclined portions, that are inclined in such a way as to make a length dimension, along a vehicle body front-and-rear direction, of the upper chamber, in a completely deployed state of the airbag body, shorter towards an upper side thereof, are disposed on upper portion sides of front edge portions of the pair of main panels.

3. The side airbag according to claim 2, wherein
   the vehicle seat is a driver's seat, and
   the airbag body is formed in such a way that, in a case in which the airbag body is seen from a vehicle body width direction in the completely deployed state, the upper chamber does not lie on top of an upper arm of a crash-test dummy of a standard American male seated in the driver's seat and the upper chamber lies on top of a shoulder of a crash-test dummy of a petite American female seated in the driver's seat.

4. The side airbag according to claim 1, wherein an interstice that allows the upper chamber and the lower chamber to be communicated with each other is formed between the tether and a site in the side panel that configures a rear of the airbag body.

5. The side airbag according to claim 1, wherein:
   the tether has a pair of extended portions that extend in a direction orthogonal to a lengthwise direction of the tether from the other long-side edge portion of the tether at both lengthwise direction end sides of the tether;
   a check valve that extends toward one of the upper chamber side or the lower chamber side is formed as a result of the pair of extended portions being sewn together; and
   the upper chamber and the lower chamber are communicated with each other via an inner side of the check valve.

6. The side airbag according to claim 1, wherein:
   a check valve that is sewn in a tubular shape and is sewn to the other long-side edge portion of the tether in a state in which the check valve extends toward one of the upper chamber side or the lower chamber side is disposed between both lengthwise direction end sides of the tether; and
   the upper chamber and the lower chamber are communicated with each other via an inner side of the check valve.

7. The side airbag according to claim 1, wherein:
   a pair of triangular notches that are disposed from the other long-side edge portion of the tether and that become narrower in width heading toward the one long-side edge portion side of the tether are formed side-by-side in a lengthwise direction of the tether at the lengthwise direction center side of the tether; and
   edge portions of the notches are superimposed on top of each other and sewn together in such a way that openings in the notches at the other long-side edge portion side are closed.

8. A method of manufacturing the side airbag according to claim 1, the method comprising:
   a first step of superimposing the side panel and the tether on top of each other in such a way that the side panel and the tether intersect each other, superimposing the one main panel on one lengthwise direction side of the tether and the one long-side edge portion of the side panel, superimposing the other main panel at the other lengthwise direction side of the tether and the other long-side edge portion of the side panel, and in this state linearly sewing the one long-side edge portion of the tether to the pair of main panels and to the side panel;

a second step of superimposing and sewing together both lengthwise direction sides of the other long-side edge portion of the tether on top of each other; and a third step of sewing together the peripheral edge portion of the one main panel and the one long-side edge portion of the side panel and sewing together the peripheral edge portion of the other main panel and the other long-side edge portion of the side panel.

\* \* \* \* \*